(No Model.)

H. J. CURTIS.
BRAKE FOR TRICYCLES.

No. 348,891. Patented Sept. 7, 1886.

Witnesses.
Dwight W. Perkins
George D. Mather

Inventor.
Henry J. Curtis

N. PETERS, Photo-Lithographer, Washington, D. C.

UNITED STATES PATENT OFFICE.

HENRY J. CURTIS, OF HARTFORD, CONNECTICUT.

BRAKE FOR TRICYCLES.

SPECIFICATION forming part of Letters Patent No. 348,891, dated September 7, 1886.

Application filed February 4, 1886. Serial No. 190,795. (No model.)

*To all whom it may concern:*

Be it known that I, HENRY J. CURTIS, a citizen of the United States, residing at Hartford, in the county of Hartford and State of Connecticut, have invented a new and useful Brake for Tricycles, of which the following is a specification.

My invention relates to improvements in construction and application of brakes to tricycles.

The object of my invention is to provide a brake that is easily applied, and simple in construction, and effective in its operation. I attain these objects by the mechanism illustrated in the accompanying drawings, in which—

Figure 1:
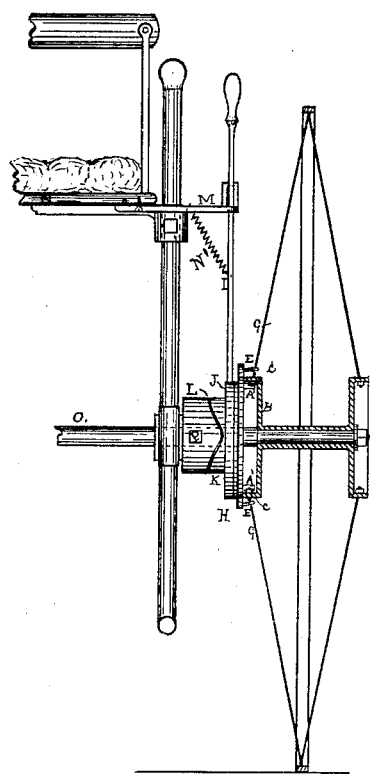
Figure 2:
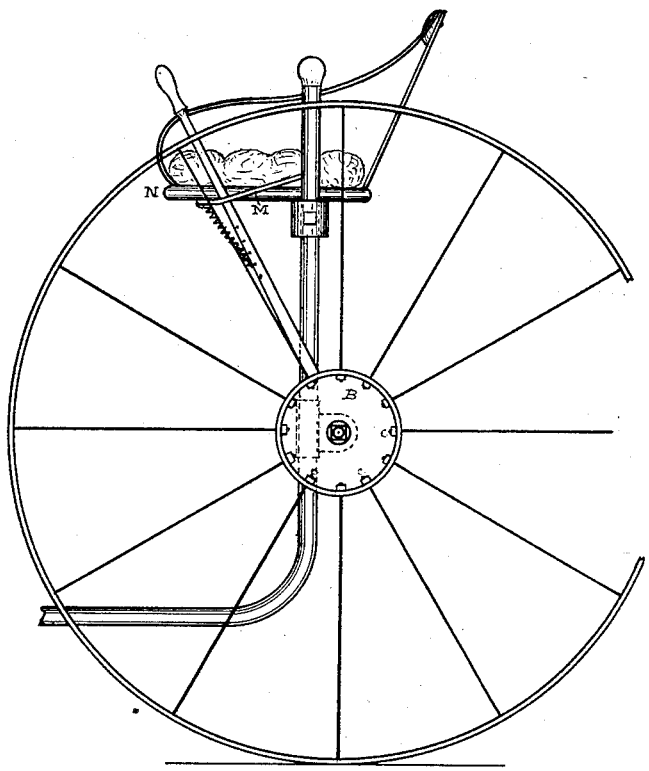
Figure 3:
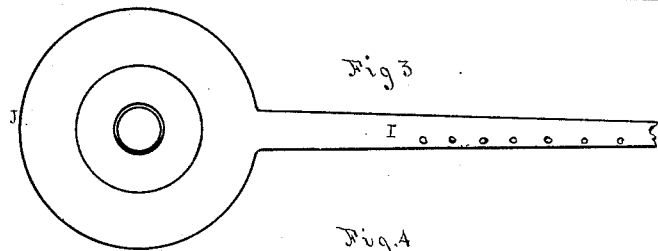
Figure 4:
Figures 5, 6:
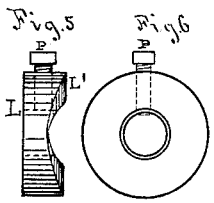
Figures 9, 10:
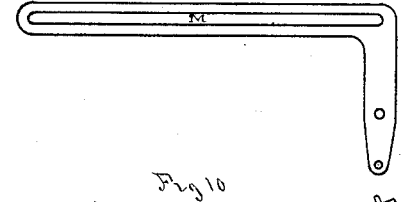
Figures 7, 8:
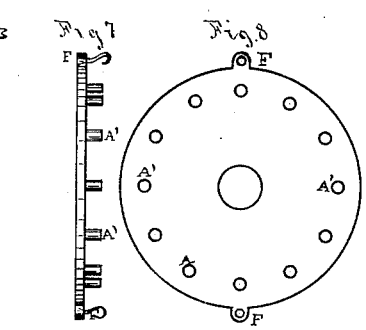

Figure 1 is a front elevation and section of wheel with brake attached. Fig. 2 is a side elevation of same. Fig. 3 is a side view of lever with corrugations on the end of its hub. Fig. 4 is an edge view of same. Fig. 5 is an edge view of collar with corrugations on its end. Fig. 6 is a side view of same. Fig. 7 is an edge view of friction-plate. Fig. 8 is a side view of same. Fig. 9 is a view of top of guide. Fig. 10 is an edge view of guide.

The friction-plate A (shown in Figs. 1, 7, and 8) has cast on one side pins A' A' A', projecting from its side sufficiently to come in contact with the nuts C C C on the inner end of the spokes G in the hub B, the said hub B having a cavity sufficiently deep to receive the pins A' A' A'. The friction-plate A is fitted loose on the axle O, and secured to the hub B by hooks E E, being attached to the friction-plate A through eyes F F, the ends being bent around the spokes G to hold the plate to the end of the hub B, causing the friction-plate A to turn with the hub B.

On one side of the lever I is secured a leather washer, H, corresponding in size to the plate J, on the lower end of the lever I and the friction-plate A. On the opposite side of the plate J is a hub with a corrugated end, K. This is attached to the lever and plate and fitted loosely to the axle O, that it may be moved by the lever I, when desired.

The collar L (shown in Figs. 5 and 6) has on its end corrugations L', corresponding in size and form to the corrugations on K, as shown in Figs. 1 and 4, and secured to the axle O by means of screw P.

The lever I has a guide, M, Fig. 9. Said guide is secured to the under side of the seat N, projecting out to receive the lever I.

N' is a spring to keep the lever I back when not in use; also to prevent the liability of noise arising from the jar of the vehicle while running.

The operation of the brake is, that when the corrugated collar L and the lever and plate I and J, with its corresponding corrugations on K, are adjusted on the axle O, by pulling on the lever I the corrugations on the hub on its lower end will be brought in contact with the corresponding corrugations on L' on collar L, which is fixed to the axle O, and force opposite side of the plate J on the lever I toward the friction-plate A, attached to hub B, causing a friction between the plate J on the lever I and the friction-plate A on the hub B to stop the wheel from rotating.

I claim—

1. The corrugated collar K on the end of lever I, in combination with the corresponding corrugated collar, L', on the axle O, working laterally with the wheel of the vehicle, as herein set forth and described.

2. The friction-plate A, attached to hub B, in combination with the lever I and the corrugated hub K and L, as herein set forth and described.

HENRY J. CURTIS.

Witnesses:
 DWIGHT W. PERKINS,
 GEORGE D. MATHER.